United States Patent [19]

Harker

[11] Patent Number: 5,437,352

[45] Date of Patent: Aug. 1, 1995

[54] AIRCRAFT BRAKE TORQUE TRANSFER ASSEMBLY

[75] Inventor: Brian G. Harker, Granger, Ind.

[73] Assignee: AlliedSignal Inc., Morristown, N.J.

[21] Appl. No.: 86,214

[22] Filed: Jul. 1, 1993

[51] Int. Cl.$^6$ ............................................. F16D 55/36
[52] U.S. Cl. ................................. 188/71.5; 188/18 A; 301/6.1
[58] Field of Search ............... 188/71.1, 71.5, 73.1, 188/18 A; 301/6.1, 6.2, 6.7

[56] References Cited

U.S. PATENT DOCUMENTS

| | | | |
|---|---|---|---|
| 1,898,313 | 2/1933 | Robbins . | |
| 1,933,176 | 10/1933 | Jonsson | 188/72 |
| 2,097,942 | 11/1937 | Whitney | 188/18 |
| 2,671,532 | 3/1954 | DuBois | 188/18 |
| 2,683,504 | 7/1954 | Martin | 188/72 |
| 2,823,770 | 2/1958 | Helvern | 188/72 |
| 2,826,274 | 3/1958 | Albright | 188/152 |
| 2,875,855 | 3/1959 | Albright | 188/18 |
| 2,914,140 | 11/1959 | Werner | 188/72 |
| 2,916,105 | 12/1959 | Dasse et al. | 188/72 |
| 3,061,050 | 10/1962 | Van Horn | 188/72 |
| 3,164,223 | 1/1965 | Kemp | 188/17 |
| 3,357,519 | 12/1967 | Anderson et al. | 188/18 A |
| 4,290,505 | 9/1981 | Kramer | 188/18 A |
| 5,062,503 | 11/1991 | Black et al. | 188/71.5 |
| 5,186,521 | 2/1993 | Niespodziany et al. | 188/71.5 X |

FOREIGN PATENT DOCUMENTS

| | | |
|---|---|---|
| 0398274 | 11/1990 | European Pat. Off. . |
| 1436050 | 3/1966 | France . |
| 62-233534 | 10/1987 | Japan . |
| 347685 | 8/1960 | Switzerland . |
| 790892 | 2/1958 | United Kingdom . |

OTHER PUBLICATIONS

AlliedSignal Inc. Drawings of F-14 Aircraft Wheel and Brake, circa 1969.

Primary Examiner—Robert J. Oberleitner
Assistant Examiner—Kevin D. Rutherford
Attorney, Agent, or Firm—Larry J. Palguta; Leo H. McCormick, Jr.

[57] ABSTRACT

The aircraft brake torque transfer assembly comprises an aircraft axle (10) having at one axial location an axle flange (18) which includes a plurality of radially extending slots (19, 119) about the circumference thereof, and at an opposite axial location a nut assembly (14) which engages the inner cone of a tapered roller bearing assembly (15) for an associated aircraft wheel (20). The aircraft wheel (20) engages another tapered roller bearing assembly (17) maintains in axial position a bushing assembly (21) and a foot (25) of a torque tube (24) which abuts against the axle flange (18). The aircraft brake (30) includes a piston housing (35) attached to the torque tube (24), and the torque tube (24) includes a plurality of openings (27) receiving key members (60) bolted to the torque tube (24). The key members (60) extend axially to be received in the respective slots (19) of the axle flange (18). The nut assembly (14) holds the wheel (20) and a bearing assembly mechanism (15, 17, 21) axially in place against the torque tube (24) which abuts the axle flange (18) so that the key member (60) transfers braking torque from the torque tube (24) to the axle flange (18) during brake operation. Alternatively, the key member (160) may comprise an integral key part (162) extending axially from the foot (25) of the torque tube (24) and received within a respective slot (119) in the axle flange (18) . The key members (60, 160) may be attached to or integral with the axle flange (18) and be received in complementary shaped openings in the torque tube (24).

10 Claims, 5 Drawing Sheets

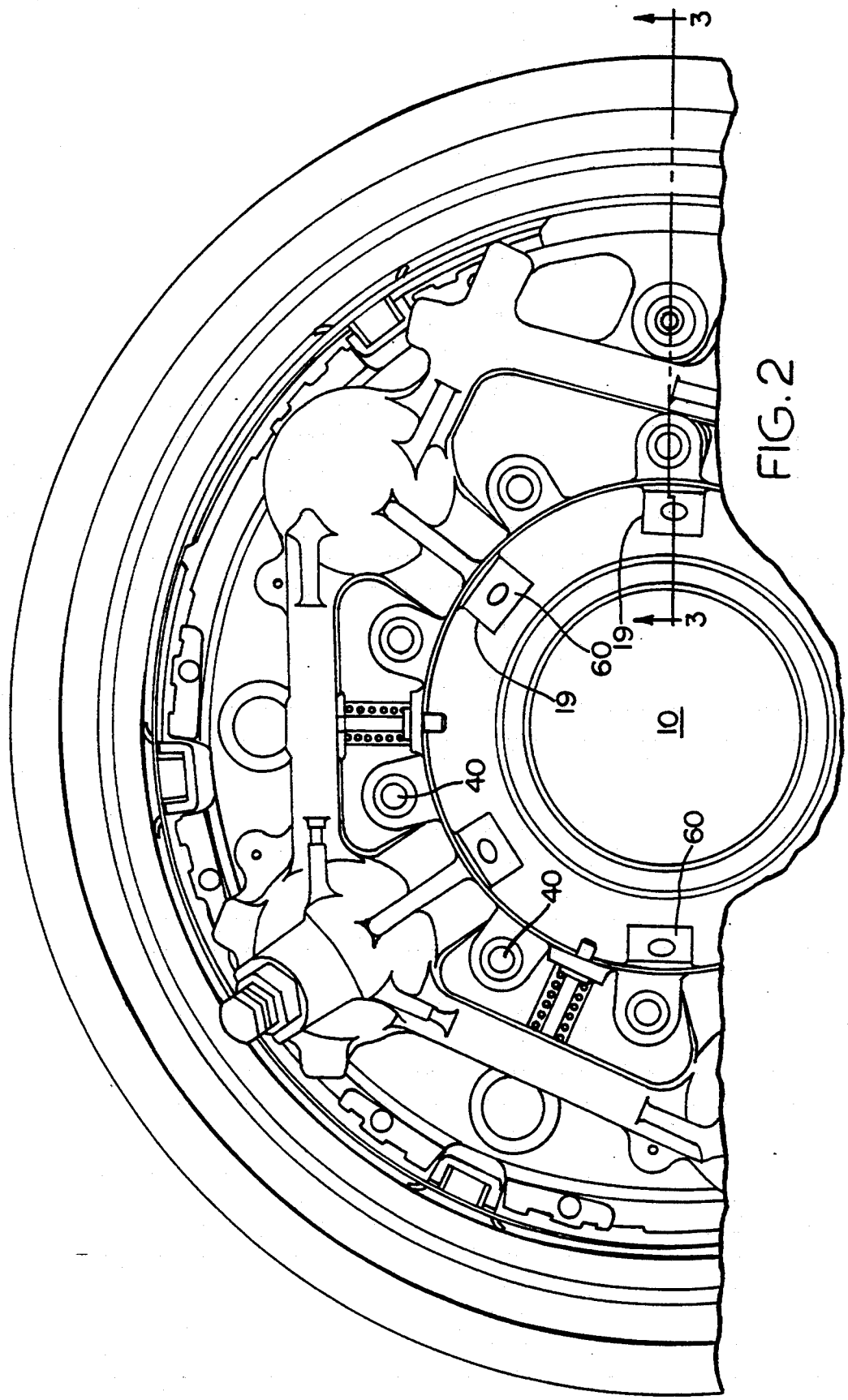

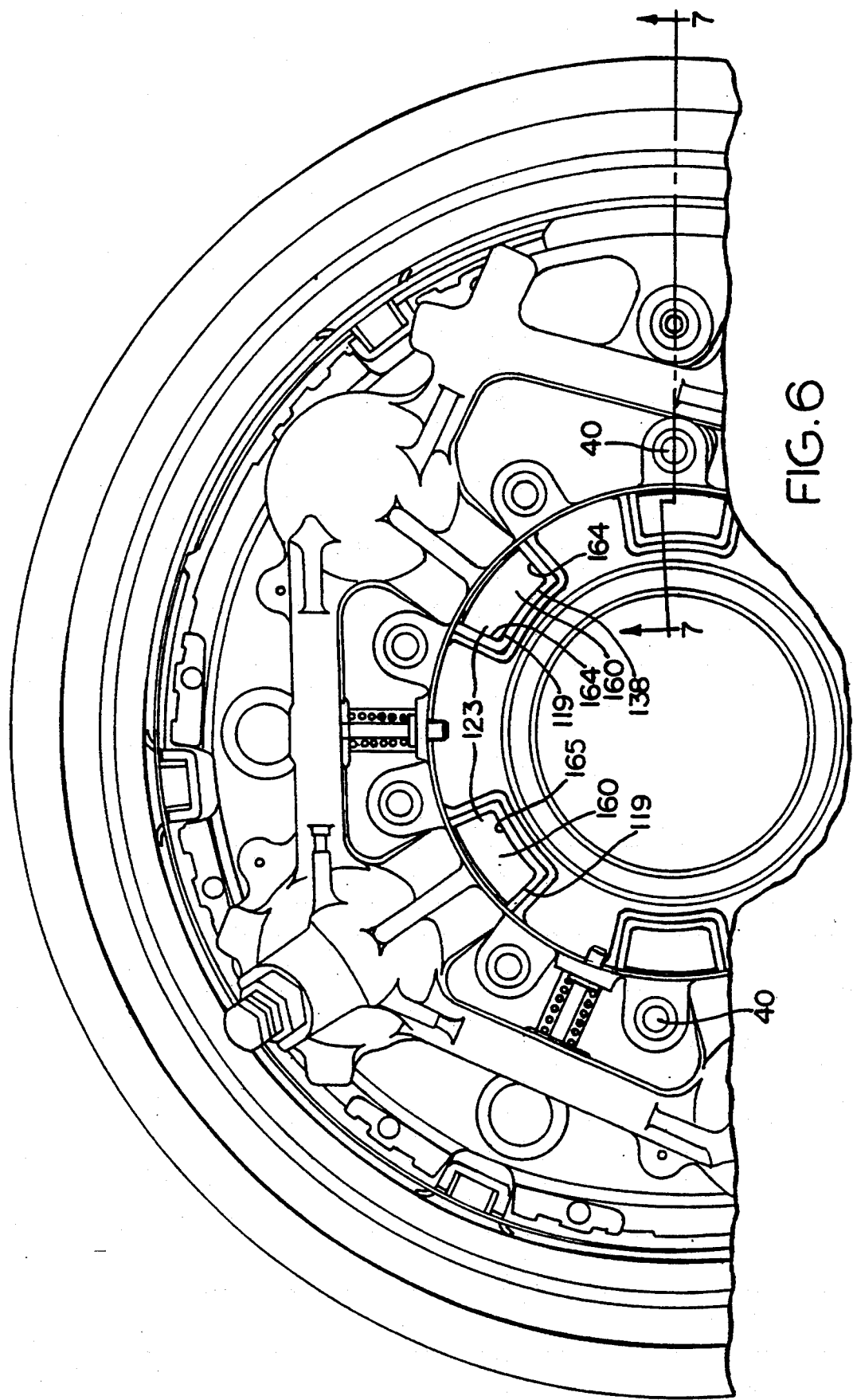

AIRCRAFT BRAKE TORQUE TRANSFER ASSEMBLY

The present invention relates generally to an aircraft wheel and brake, and in particular to a nonrotatable connection of the torque tube with an axle of the aircraft.

Aircraft wheels and brakes comprise, generally, an aircraft wheel mounted by tapered roller bearings on an aircraft axle, with the bearings and wheel held in place on the axle by means of a nut assembly. A torque tube is received about the axle and connected by a plurality of bolts and nuts to an axle flange. The torque tube is connected by a key or spline connection to a plurality of stator discs while a plurality of rotor discs are connected by a similar key or spline connection to the rotatable wheel. A piston housing is connected to the torque tube by a series of bolts, or may be connected to the torque tube and axle flange by the same set of bolts and nuts which attach the torque tube to the axle flange. The torque tube may be made of titanium which is an expensive material. Because the bolts and nuts attaching the torque tube to the axle flange create a compressive force by means of the head of the bolt pressing against a radial surface of the axle flange while the nut threadedly attached to the other end of the bolt presses against a radial surface of the torque tube or vice versa, the potential for a shear joint is created. During a brake operation, braking torque is transferred from the stators to the torque tube and axle flange. The torque tube exerts a rotational force relative to the axle flange and because of the compressive forces exerted by the bolt head and nut, the shear joint exists. The shear joint between the axle flange and torque tube causes movement of the shaft of the bolt and this can cause an enlargement or ovalization in the opening of the torque tube because the titanium material of the torque tube is softer than the high strength metal of the axle flange. This can result in the required replacement of the torque tube which, because it is made of titanium, is an undesirable expense. It is highly desirable to provide a torque transfer connection or assembly between the torque tube and axle flange which will minimize or eliminate damage to the torque tube, and if replacement of parts is necessary, the parts to be replaced should be less expensive and more easily replaceable than a titanium torque tube. It is also highly desirable to provide an aircraft brake assembly having a torque transfer assembly that provides quick and easy assembly and disassembly in order to minimize changeover time and expense.

The present invention provides solutions to the above by providing a brake torque transfer assembly, comprising axle means upon which is mounted rotatably a wheel via bearing means, a brake assembly comprising a torque tube engaging nonrotatably said axle means and maintained at a predetermined axial position by abutting said axle means, a piston housing connected with said torque tube, at least one disc member connected with said torque tube, and at least a second disc member connected with said wheel, the torque tube engaging nonrotatably the axle means via at least one key member extending from one of the torque tube and axle means and received engagingly with the other of said axle means and torque tube, and nut means at said axle means and engaging said bearing means, the torque tube abutting the axle means and maintained at the predetermined axial position via engagement with the bearing means which engages the wheel means which engages said nut means.

The invention is described in detail below with reference to the drawings which illustrate embodiments in which:

FIG. 2 is an end view of the piston housing, axle and wheel of FIG. 1;

FIG. 6 is an end view of a piston housing, axle and wheel of FIG. 5; and

Figure 1:
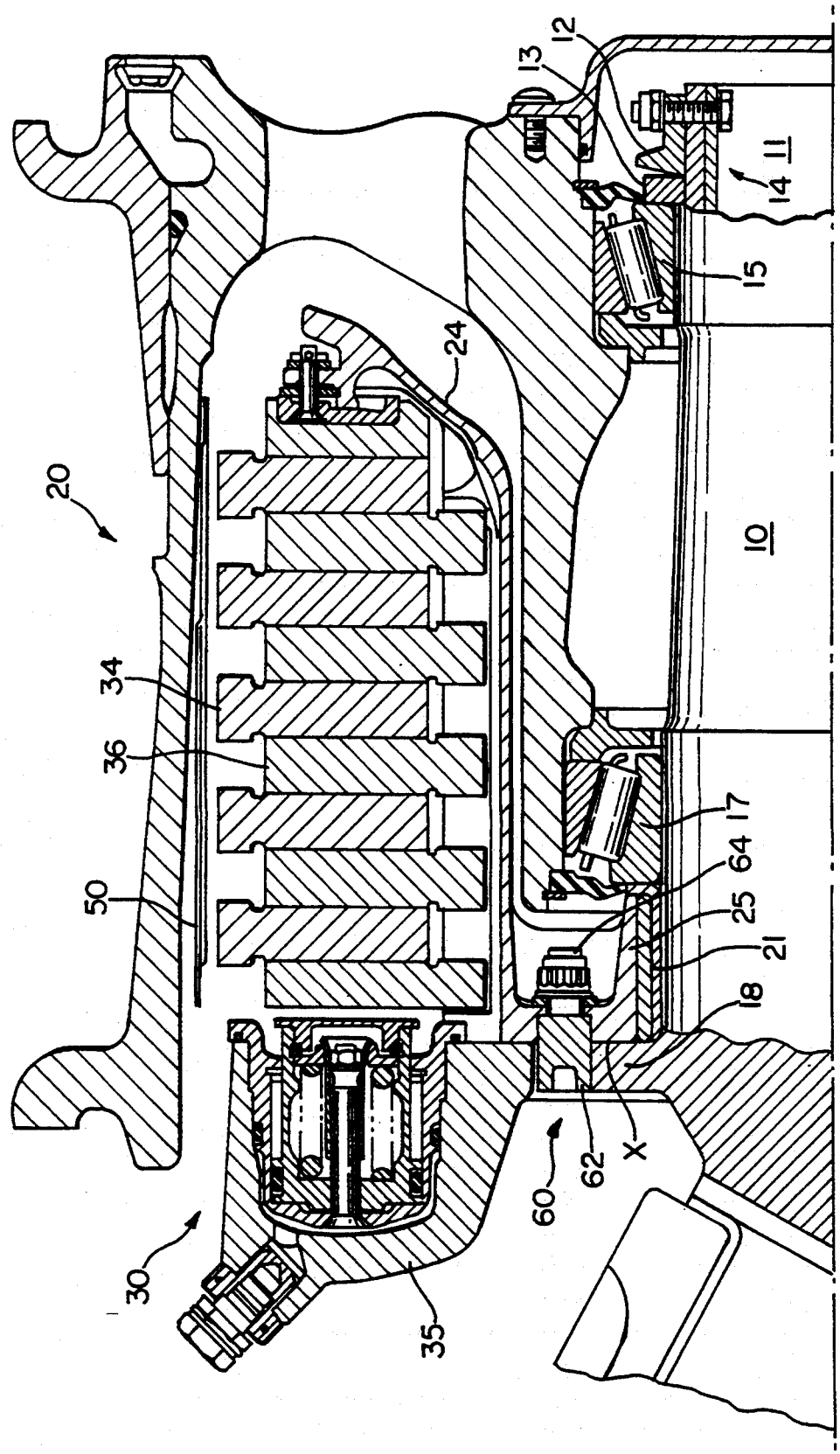
FIG. 1 is a section view of an aircraft axle, wheel and brake illustrating a first embodiment of the invention.

FIG. 1 illustrates in section view an aircraft axle, wheel and brake which includes the present invention. Axle 10 includes at end 11 a nut assembly 14 which includes nut 12 and washer 13. Nut 12 and washer 13 abut the inner cone of bearing assembly 15 that supports rotatably an aircraft wheel indicated generally by reference numeral 20. Aircraft wheel 20 is also supported by tapered roller bearing assembly 17 located at an end of axle 10 which includes axle flange 18. Tapered roller bearing assembly 17 abuts bushing assembly 21 which supports foot 25 of torque tube 24. Bearing assemblies 15 and 17 and bushing assembly 21 comprise a bearing means which supports wheel 20 on axle 10 and torque tube 24 on axle 10, respectively. Roller bearing assembly 17 retains operatively, via bushing assembly 21, torque tube foot 25 in axial engagement with axle flange 18. Thus, torque tube 24 is maintained axially in place by means of the nut assembly 14 which engages roller bearing assembly 15 that engages wheel 20 which engages roller bearing assembly 17 that retains axially in place bushing assembly 21 and torque tube foot 25 that abuts axle flange 18. In other words, the nut assembly 14, bearing means (assemblies 15, 17 and 21), and wheel 20 maintain the torque tube 24 at a predetermined axial position on axle 10 wherein torque tube 24 abuts flange 18.

Figure 3:
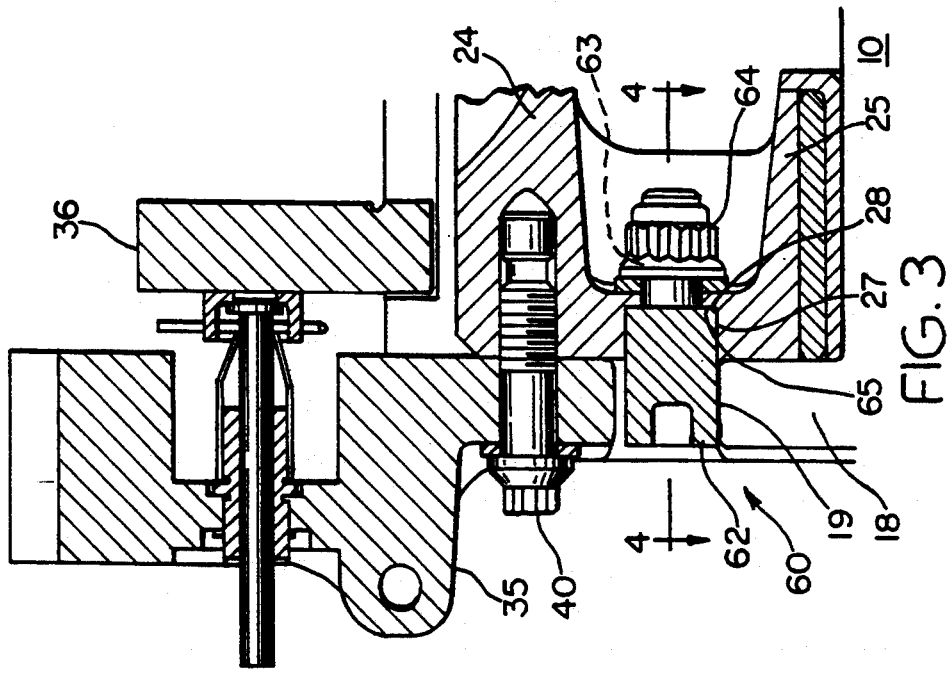
FIG. 3 is a partial view taken along view line 3—3 of FIG. 2.

Aircraft brake 30 includes a plurality of rotors 34 connected by typical key or spline connections with wheel 20 and a plurality of stators 36 connected by key or spline connections with torque tube 24. Brake 30 includes piston housing 35 attached by a plurality of bolts 40 (see FIGS. 2 and 3) to torque tube 24. Brake 30 includes heat shield 50. FIG. 3 illustrates a partial section view of the torque tube 24, piston housing 35, axle flange 18 and stator disc 36, wherein bolts 40 threadedly connect piston housing 35 with torque tube 24. In order to transfer braking torque from the torque tube to the axle, the torque tube 24 is connected with the axle flange 18 via an abutting engagement. The abutting engagement is effected by a plurality of key members 60 which comprise key parts 62 each having a nonthreaded shank extending to a threaded shaft 63 (indicated inside the nut 64 but not shown) receiving threadedly thereon nut 64. Each key part 62 may include a shoulder 65 which engages a complementary shaped shoulder 28 in the torque tube stepped opening 27. Key parts 62 may be generally rectangularly shaped as illustrated in FIG.

2 and received within complementary shaped slot openings 19 disposed circumferentially about axle flange 18. Alternatively, each key member 60 can be attached via an opening in axle flange 18 with the key part 62 extending into a complementary shaped opening in the torque tube 24.

The aircraft brake torque transfer assembly of the present invention provides an improved connection of the torque tube with the axle via the axle flange. Prior connections of the torque tube with the axle flange comprised generally a bolt having an enlarged head which abutted a radial surface of the axle flange and a nut which abutted an axially opposite radial surface of the torque tube foot, or vice versa. Because the bolt and nut connection exerted compression between the axle flange and torque tube foot, braking torque being transferred from the torque tube foot to the axle flange effected the transfer via a sheer joint. In other words, the sheer joint resulted from the bolt head and the nut being relatively inflexible and the braking torque being exerted on the shaft of the bolt at the interface X (see FIG. 1) between the axle flange and the torque tube foot. This would cause bending of the bolt shaft and result in an enlargement or ovalization of the opening in the torque tube foot, because the torque tube is typically made of titanium which is softer than the metal material of the axle flange. The present invention eliminates the compressive force exerted between the bolt head and nut upon both the axle flange and torque tube foot via a sheer joint, by providing a key member which is bolted to the torque tube foot and which extends into abutting engagement with the corresponding slot 19 the axle flange 18, or vice versa. This creates a bending joint whereby the braking torque effects a slight bending or distortion of the key part 62 rather than an ovalization or distortion of the opening 27 in the torque tube foot. As a result, should there be any wear of the parts (62, 63, 64, 65) of the key member 60 over an extended period of time, the key member is easily and inexpensively replaced while the torque tube 24 may continue to be used. An additional advantage of the present invention is that the key part 62 may have a variable shape and thereby provide a variable shear area and variable bearing area in its engagement with the slot 19 of axle flange 18, as compared to the engagement of a round shaft with a round opening. If a round shaft/round opening engagement connection is utilized, whenever the bearing area is to be increased the overall dimension of the opening and the shaft is increased in all directions and this can result in the reduction of material at locations where such is not desired. A non-round or non-circular shape of key part 62 enables the bearing area and shear area to be increased in one or more directions without an increase in an orthogonal direction. A very important advantage of the present invention is the quick changeover time of the brake assembly provided by the torque transfer assembly. The use of a bolt/nut type of connection between the torque tube and axle flange is eliminated and the present invention provides a slide together nonrotatable connection.

Copending U.S. patent application Ser. No. 08/086,213 entitled "Aircraft Brake Assembly Retention Mechanism" discloses a mechanism that retains the brake assembly axially in place when the wheel is removed.

Figure 7:
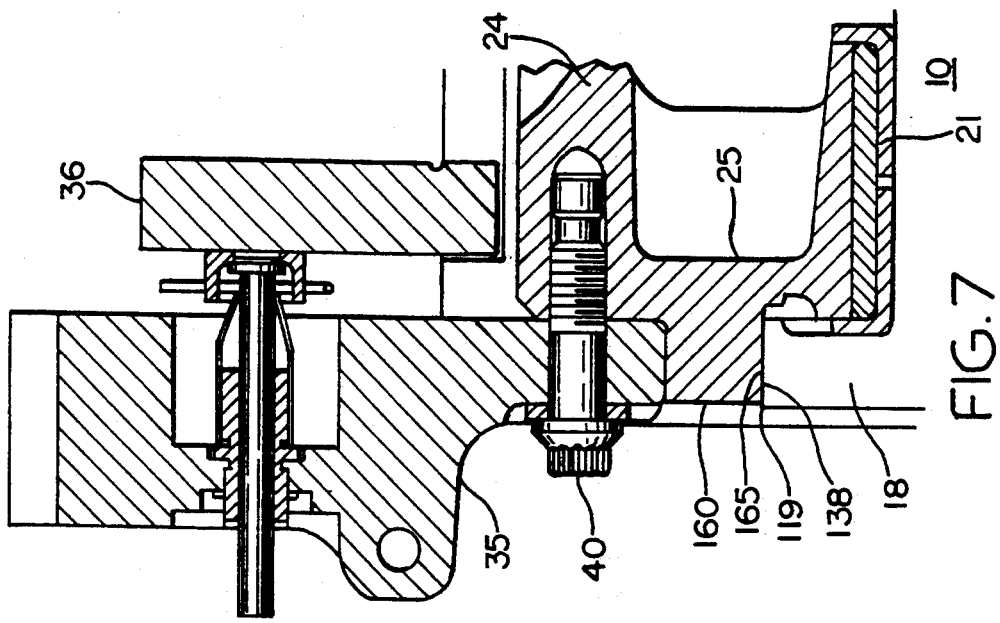
FIG. 7 is a view taken along view line 7—7 of FIG. 6.
Figure 4:
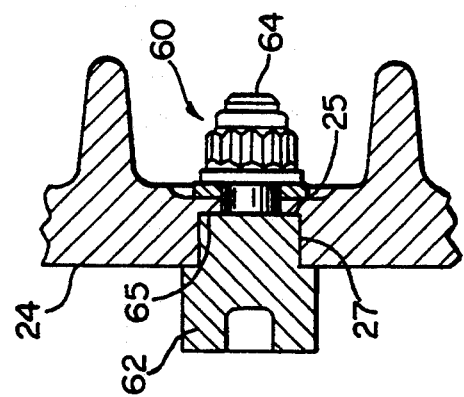
FIG. 4 is a view taken along view line 4—4 of FIG. 3.
Figure 5:
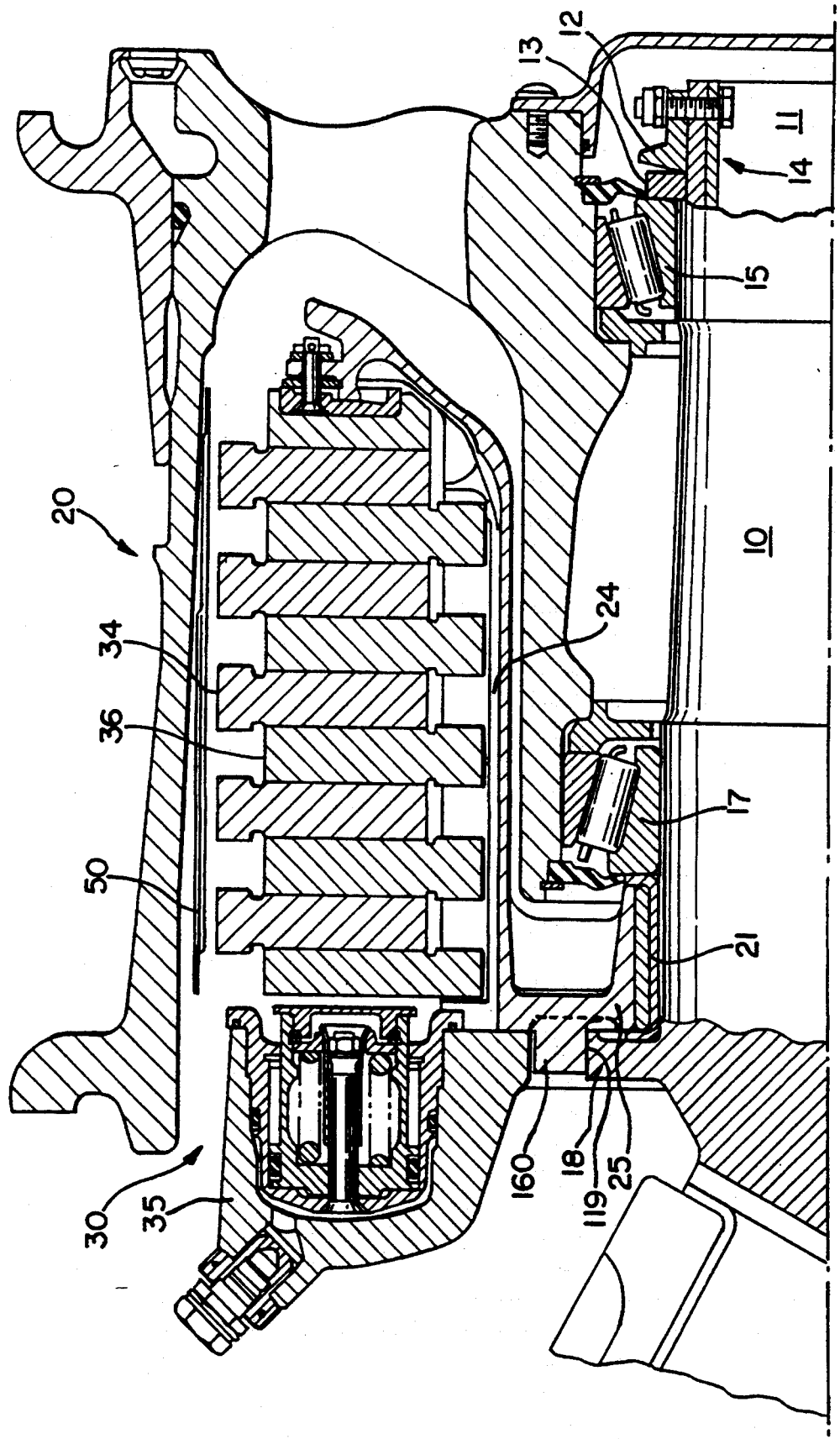
FIG. 5 is a section view of an aircraft axle, wheel and brake including a second embodiment of the present invention.

FIGS. 5-7 illustrate an alternative embodiment of the present invention. Identical structure will be identified by the same numerals, and similar structure will be identified by reference numerals increased by 100. Torque tube 24 includes tube foot 25 having a plurality of integral and axially extending key members 160 received within correspondingly shaped slots 119 (see FIG. 6) of axle flange 18. As illustrated in FIG. 6, slots 119 include radial sides 123 which lie along respective radiuses of axle flange 18. Also, integral key members 160 include radial sides 164 which also lie along respective radiuses of axle flange 18 and radiuses of torque tube 24. The radially inner and mutually engaging surfaces 165 of key members 160 and 138 of slots 119 are arcuately shaped (see FIGS. 6 and 7). Thus, the torque tube is connected by abutting engagement of key members 160 with respective slots 119 of the axle flange 18, while piston housing 35 is t5 connected to the torque tube via bolts 40. The aircraft brake torque transfer is essentially-as described above wherein axle nut assembly 14 abuts tapered roller bearing assembly 15 which engages wheel 20 that engages tapered roller bearing assembly 17 that abuts bushing assembly 21 to retain in place torque tube foot 25 which abuts axle flange 18. The torque tube foot 25 is trapped between roller bearing assembly 17/bushing assembly 18 and axle flange 18. Alternatively, the key members 160 can be integral with axle flange 18 and extend into complementary shaped openings in torque tube foot 25.

I claim:

1. A brake torque transfer assembly, comprising axle means upon which is mounted rotatably a wheel via bearing means, a brake assembly comprising a torque tube engaging nonrotatably said axle means and maintained at a predetermined axial position by abutting said axle means, a piston housing connected with said torque tube, at least one disc member connected with said torque tube, and at least a second disc member connected with said wheel, the torque tube engaging directly and nonrotatably the axle means via at least one key member extending from one of the torque tube and axle means and received engagingly with the other of said axle means and torque tube, the key member comprising a key part received within a complementary shaped opening of said torque tube and held in engagement therewith by a nut member received on said key part, and nut means at said axle means and engaging said bearing means, the torque tube abutting the axle means and maintained at the predetermined axial position via engagement with the bearing means which engages both the wheel means and said nut means.

2. The assembly in accordance with claim 1, wherein said key part is generally rectangularly shaped and includes a threaded shaft extending through said opening and receiving thereon the nut member.

3. The assembly in accordance with claim 2, wherein the key part includes a shoulder, the opening comprising a stepped opening which includes a complementary shaped shoulder engaged by the shoulder of the key part.

4. The assembly in accordance with claim 3, wherein the piston housing is attached to the torque tube by means of a plurality of bolts threadedly received in openings in the torque tube.

5. The assembly in accordance with claim 1, wherein the axle means includes an axle flange including a plurality of radially extending slots about the circumference thereof with each slot receiving in abutting engagement a respective key member.

6. The assembly in accordance with claim 5, wherein said key part is generally rectangularly shaped and includes a threaded shaft extending through an opening in the torque tube and receiving thereon the nut member.

7. The assembly in accordance with claim 6, wherein the key part includes a shoulder, the opening comprising a stepped opening which includes a complementary shaped shoulder engaged by the shoulder of the key part.

8. A brake torque transfer assembly, comprising axle means upon which is mounted rotatably a wheel via bearing means, a brake assembly comprising a torque tube engaging nonrotatably said axle means and maintained at a predetermined axial position by abutting a radially extending flange of said axle means, a piston housing connected with said torque tube, at least one disc member connected with said torque tube, and at least a second disc member connected with said wheel, the torque tube engaging nonrotatably the flange of the axle means via at least one key member extending from one of the torque tube and axle means and received engagingly with the other of said axle means and torque tube, the key member having a non-circular shape and including a key part that is generally rectangularly shaped and includes a threaded shaft extending through a complementary opening of said torque tube and receiving thereon a nut member, and nut means at said axle means and engaging said bearing means, the torque tube abutting the flange and maintained at the predetermined axial position via engagement with the bearing means which engages both the wheel means and which engages said nut means.

9. The assembly in accordance with claim 8, wherein the flange includes a plurality of radially extending slots about the circumference thereof, and a plurality of key members extending integrally from the torque tube and received in abutting engagement in respective slots of the flange.

10. The assembly in accordance with claim 9, wherein each key member and slot includes a generally arcuate curvature at respective circumferentialy extending surfaces thereof.

* * * * *